(12) United States Patent
Sakima et al.

(10) Patent No.: US 10,538,251 B2
(45) Date of Patent: Jan. 21, 2020

(54) COURSE ESTIMATOR AND METHOD OF ESTIMATING A STATE OF A COURSE OF A VEHICLE AND A NON-TRANSITORY COMPUTER-READABLE STORAGE MEDIUM FOR THE SAME

(71) Applicant: DENSO CORPORATION, Kariya, Aichi-pref. (JP)

(72) Inventors: Taku Sakima, Chiryu (JP); Yuusuke Matsumoto, Aichi-ken (JP); Syunya Kumano, Gothenburg (SE); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 664 days.

(21) Appl. No.: 14/575,006

(22) Filed: Dec. 18, 2014

(65) Prior Publication Data
US 2015/0175166 A1  Jun. 25, 2015

(30) Foreign Application Priority Data
Dec. 20, 2013 (JP) .................. 2013-263913

(51) Int. Cl.
*G01B 21/10* (2006.01)
*B60W 40/072* (2012.01)

(52) U.S. Cl.
CPC .......... *B60W 40/072* (2013.01); *G01B 21/10* (2013.01)

(58) Field of Classification Search
CPC ......... G06F 13/00; G06F 9/445; G01B 21/10; H06R 6/07

(Continued)

(56) References Cited

U.S. PATENT DOCUMENTS

| 5,648,905 A | 7/1997 | Izumi et al. |
| 6,141,617 A | 10/2000 | Matsuda et al. |

(Continued)

FOREIGN PATENT DOCUMENTS

| EP | 1 624 289 | 10/2013 |
| JP | H10-269498 | 10/1998 |

(Continued)

OTHER PUBLICATIONS

Search Report dated Apr. 22, 2015 in corresponding European Application No. 14199161.2-1803.

(Continued)

*Primary Examiner* — Mushfique Siddique
(74) *Attorney, Agent, or Firm* — Harness, Dickey & Pierce, P.L.C.

(57) ABSTRACT

A course estimator has a first estimating means, a second estimating means and a determining means. The first estimating means obtains first information and estimating a first radius of a first forward traveling path on the basis of the obtained first information, the first forward traveling path being a part of a forward traveling path to which a vehicle is going to travel. The second estimating means obtains second information and estimating a second radius of a second forward traveling path on the basis of the obtained second information, the second forward traveling path being a part of the forward traveling path to which a vehicle is going to travel, the second forward traveling path being farther from the vehicle than the first traveling being. The determining means determines whether or not there is a changing point where road shapes change between the first forward traveling path and the second forward traveling path on the basis of comparison of the estimated first radius and the estimated second radius.

6 Claims, 5 Drawing Sheets

(58) Field of Classification Search
USPC .......................................................... 702/157
See application file for complete search history.

(56) References Cited

U.S. PATENT DOCUMENTS

| | | | |
|---|---|---|---|
| 6,163,741 A | 12/2000 | Matsuda et al. | |
| 9,302,673 B2* | 4/2016 | Sakima | B60W 30/165 |
| 9,524,160 B2* | 12/2016 | Takahashi | G06F 13/00 |
| 2004/0143416 A1* | 7/2004 | Hattori | B60K 31/0066 |
| | | | 702/157 |
| 2006/0028832 A1* | 2/2006 | Horii | B60Q 1/12 |
| | | | 362/514 |
| 2007/0191997 A1* | 8/2007 | Isaji | B60T 7/22 |
| | | | 701/1 |
| 2008/0119996 A1* | 5/2008 | Hozumi | B60N 2/0248 |
| | | | 701/49 |
| 2011/0178689 A1* | 7/2011 | Yasui | B60T 7/12 |
| | | | 701/70 |
| 2011/0218724 A1* | 9/2011 | Iida | G01C 21/32 |
| | | | 701/70 |
| 2011/0264302 A1* | 10/2011 | Tsunekawa | B60W 40/072 |
| | | | 701/1 |
| 2012/0046802 A1* | 2/2012 | Inou | B60W 30/10 |
| | | | 701/1 |
| 2015/0175167 A1* | 6/2015 | Sakima | B60W 40/072 |
| | | | 702/157 |
| 2015/0301822 A1* | 10/2015 | Takahashi | G06F 13/00 |
| | | | 717/173 |

FOREIGN PATENT DOCUMENTS

| | | |
|---|---|---|
| JP | H10-283596 | 10/1998 |
| JP | 2005-140749 | 6/2005 |
| JP | 2006-126923 | 5/2006 |
| JP | 2007-008281 | 1/2007 |
| JP | 2009-009209 | 1/2009 |

OTHER PUBLICATIONS

Office Action dated Oct. 27, 2015 in corresponding Japanese Application No. 2013-263913 with English translation.

* cited by examiner

COURSE ESTIMATOR AND METHOD OF ESTIMATING A STATE OF A COURSE OF A VEHICLE AND A NON-TRANSITORY COMPUTER-READABLE STORAGE MEDIUM FOR THE SAME

CROSS-REFERENCE TO RELATED APPLICATION

This application is based on and claims the benefit of priority from earlier Japanese Patent Application No. 2013-263913 filed Dec. 20, 2013, the description of which is incorporated herein by reference.

BACKGROUND

Technical Field

The present invention relates to a course estimator for estimating a state of a course of a vehicle and a non transitory computer-readable storage medium for the same.

Related Art

Conventionally, there has been known a device mounted on a vehicle for estimating a road shape (referred to as a course shape) of the forward traveling path to which the own vehicle is going to travel (see PTL1 (JP 2009-9209 A)).

The device disclosed in PTL1 detects the turning direction (and the turning radius) of the own vehicle on the basis of detection results (i.e. yaw rate) of a yaw rate sensor or detection results (i.e. steering angle) of a steering angle sensor. Further, the device estimates the course shape as the detected turning radius and turning direction of the own vehicle under the assumption that the detected turning radius and turning direction are kept on the forward travelling path of the own vehicle.

However, on a road where the curvature changes, the device disclosed in PTL1 cannot detect the changing point of the curvature, because the device estimates the course shape under the assumption that the detected turning radius and turning direction at specified time are kept on the forward traveling path of the own vehicle. In the device disclosed in PTL1, this causes a deviation of the estimated course shape from the actual course shape of the forward traveling path.

That is, the method of estimating the course shape by the device disclosed in PTL1 has poor accuracy for estimating the course shape.

This disclosure has its object of improving accuracy for estimating a course shape in a course estimator.

SUMMARY

In order to achieve the above object, an aspect of this disclosure relates to a course estimator.

The course estimator of the aspect has a first estimating means, a second estimating means and a determining means.

Of these, the first estimating means obtains first information, and estimates a first radius of a first forward traveling path on the basis of the obtained first information. The first forward traveling path is a part of a forward traveling path to which a vehicle is going to travel.

The second estimating means obtains second information, and estimates a second radius of a second forward traveling path on the basis of the obtained second information. The second forward traveling path is a part of the forward traveling path to which a vehicle is going to travel, the second forward traveling path being farther from the vehicle than the first traveling being.

The determining means determines whether or not there is a changing point where road shapes change between the first forward traveling path and the second forward traveling path on the basis of comparison of the estimated first radius and the estimated second radius.

It should be noted that the curvature radius is an indicator indicating a radius R of a circular arcuate curved-line of a road. The curvature radius in this disclosure includes not only a direct curvature radius but also an indicator based on a curvature radius such as a curvature (1/R).

The object of this disclosure can be realized not only by the above-described estimator but also by various embodiments such as a program executed in a computer or an estimating method.

DETAILED DESCRIPTION OF PREFERRED EMBODIMENTS

Hereinafter is described an embodiment with reference to the drawings.

Drive Assist System

A drive assist system 1 is a system mounted to a vehicle (specifically, an automobile). The drive assist system 1 recognizes a road shape of the course (referred to as forward traveling path, below) to which the own vehicle is going to travel, and controls the vehicle velocity or vehicle acceleration to keep a proper distance between the own vehicle and another vehicle (leading vehicle) which is traveling ahead of the own vehicle.

Figure 1:
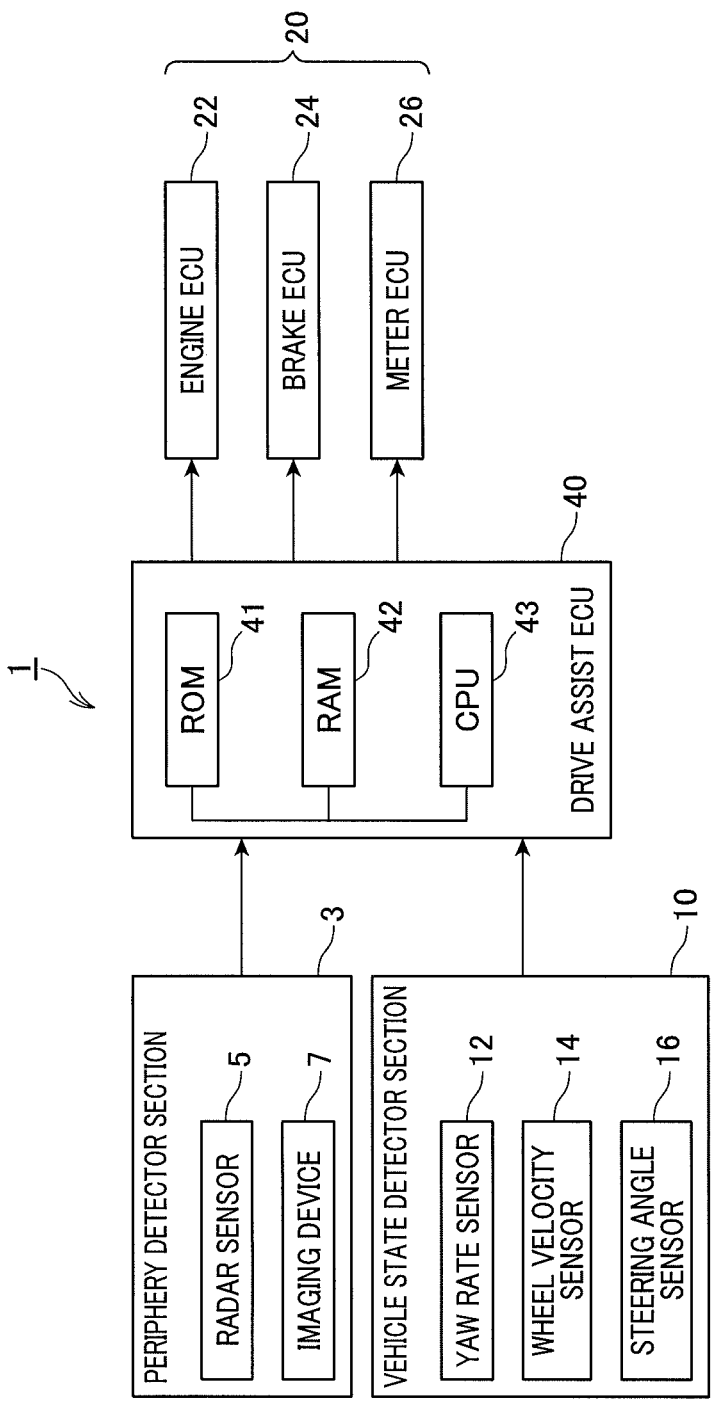
FIG. 1 is a block diagram showing a schematic configuration of a drive assist system having a drive assist ECU as a path estimation device to which the present invention is applied.

In order to realize this, the drive assist system 1 has a periphery detector section 3, a vehicle state detector section 10, a vehicle control section 20, and a drive assist control unit (referred to as a drive assist ECU in this embodiment) 40, as shown in FIG. 1.

The periphery detector section 3 obtains information (referred to as state estimation information, below) for detecting the state of the forward traveling path. The periphery detector section 3 has a radar sensor 5 and an imaging device 7.

The radar sensor 5 transmits and receives detection waves, and detects, on the basis of the results of transmitting and receiving the detection waves, a position of a target which has reflected the detection waves as the state estimation information. The radar sensor 5 in this embodiment is a laser radar which outputs laser light as the detection waves by scanning a predetermined angular range ahead of the own vehicle. Also, the laser radar detects the reflected light. The radar sensor 5 calculates distance and angle measurement data as the position of the target. The distance measurement data indicates a distance to an object, and is calculated from the time taken for the laser light to reach and return from the object which has reflected the laser light. The angle measurement data indicates the orientation of the object which has reflected the laser light.

It should be noted that the radar sensor 5 is not limited to a sensor using laser light as detection wave. As the radar sensor 5, there may be used a sensor (so-called millimeter-wave radar) using radio wave in a millimeter-wave band as detection waves, or a sensor (so-called sonar) using sonic waves as detection waves.

The imaging device 7 is a well-known camera mounted to a vehicle such as to image a predetermined angular range in the traveling direction of the own vehicle. The imaging device 7 obtains an image which itself has captured as the state estimation information.

The vehicle state detector section 10 obtains information indicating the behavior of the own vehicle. The vehicle state detector section 10 has a yaw rate sensor 12, wheel velocity sensors 14, and a steering angle sensor 16.

The yaw rate sensor 12 outputs a signal depending on the turning angular velocity (yaw rate) γ of the own vehicle.

The wheel velocity sensors 14 are provided to each a left front wheel, a right front wheel, a left rear wheel and a right rear wheel. The wheel velocity sensor 14 outputs pulse signals each having a sharp edge which occurs when a rotating axis of the wheel is at a predetermined rotational angle, i.e. pulse signals at pulse intervals depending on rotational velocity of the axis of the wheel.

The steering angle sensor 16 outputs a signal depending on steering angle, for example, relative steering angle (change amount of steering angle) of a steering wheel or absolute steering angle (actual steering angle based on a steering position when the vehicle is traveling straight) of the steering wheel.

The vehicle control section 20 has electronic control units (ECU) that control vehicle equipment mounted on the vehicle. The vehicle control section 20 has an engine ECU 22, a brake ECU 24, and a meter ECU 26.

The engine ECU 22 is an electronic control unit having a CPU, a ROM, a RAM and so on, and controls start and stop of the engine, fuel injection amount, ignition timing, etc. Specifically, the engine ECU 22 controls an actuator that opens and closes a throttle valve provided at an intake pipe, depending on a detection value of a sensor for detecting depression amount of an accelerator pedal. The engine ECU 22 controls the throttle actuator on the basis of an instruction from the drive assist ECU 40 to increase or decrease driving force of an internal combustion engine.

The brake ECU 24 is an electronic control unit having a CPU, a ROM, a RAM, etc. The brake ECU 24 controls braking of the own vehicle. Specifically, the brake ECU 24 controls a brake actuator to increase or decrease braking force, depending on control input from the driver. In this embodiment, the brake system is a hydraulic brake, and the brake ECU 24 controls an actuator that opens and closes a valve for increasing or decreasing pressure of working fluid, depending on a detection value of a sensor detecting the depression amount of the brake pedal. Further, the brake ECU 24 controls the brake actuator to increase or decrease the braking force, on the basis of instructions from the drive assist ECU 40.

The meter ECU 26 is an electronic control unit having a CPU, a ROM, a RAM, etc. The meter ECU 26 controls display on a meter display provided to the vehicle, on the basis of instructions from each portion of the vehicle including the drive assist ECU 40. Specifically, the meter ECU 26 displays the vehicle velocity, the rotational speed of the engine, an execution state or control mode of control which a controller for inter-vehicle control executes on the meter display.

Drive Assist ECU

The drive assist ECU 40 is an electronic control unit that executes drive assist control. The drive assist ECU 40 has a well-known computer including at least a ROM 41, a RAM 42, a CPU 43 and the like, as a main portion.

The ROM 41 stores processing programs and data which need to be held even when electric power is not supplied. The RAM 42 temporarily stores processing programs and data. The CPU 43 executes processes on the basis of the processing program stored in the ROM 41 and RAM 42.

Further, the drive assist ECU 40 has a detection circuit, an input-output interface (I/O), and a communication circuit. The detection circuit detects the signals from the periphery detector section 3 and the vehicle state detector section 10 and converts them into digital values. The I/O receives the input from an A/D converter of the detection circuit. The communication circuit communicates with the vehicle control section 20. These circuits have well-known hardware constructions, therefore detail descriptions are omitted.

The ROM 41 contains thereon process programs for a drive assist process executed by the drive assist ECU 40. In the drive assist process, the drive assist ECU 40 recognizes the road shape of the forward traveling path on the basis of the signals from the periphery detector section 3 and the vehicle state detector section 10. The drive assist ECU 40 assists driving of the own vehicle on the basis of the recognition, thereby performing a drive assist control. The drive assist control described here includes, for example, adaptive cruise control (ACC).

The ACC is a well-known control. In the ACC, the drive assist ECU 40 specifies a target vehicle on the basis of the signals from the periphery detector section 3 or the vehicle state detector section 10, and output the engine ECU 22 or the brake ECU 24 a control command to keep an inter-vehicular distance to the specified target vehicle at a predetermined distance. Further, in the ACC, the drive assist ECU 40 may output the meter ECU 26 display information on the ACC or a command for alarming when a predetermined condition is satisfied.

Drive Assist Process

Next is described the drive assist process executed by the drive assist ECU 40.

The drive assist process is started at a predetermined time intervals (for example, 100 ms).

Figure 2:
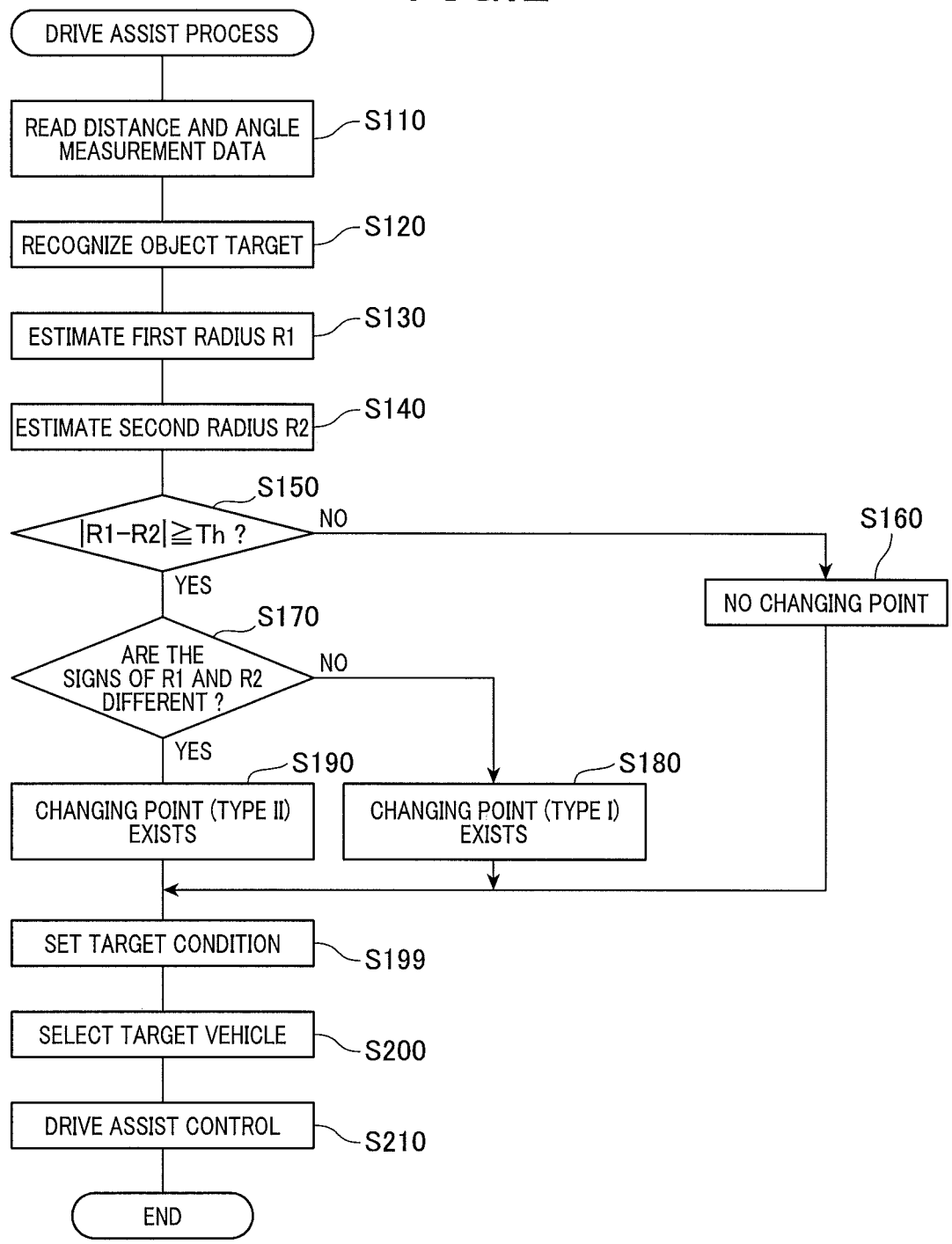
FIG. 2 is a flow chart showing a process sequence of a drive assist flow which the drive assist ECU executes.

On starting the drive assist process, as shown in FIG. 2, at first, the drive assist ECU 40 reads the state estimation information detected by the periphery detector section 3 (S110). In S110 of this embodiment, as the state estimation information; the drive assist ECU 40 reads the distance and angle measurement data detected by the radar sensor 5.

Subsequently, the drive assist ECU 40 converts the distance and angle measurement data read in the S110 and expressed in the polar coordinate system to the Cartesian coordinate system. Thereafter, the drive assist ECU 40 executes, on the basis of the converted data, a target recognition process for recognizing the target existing ahead of the own vehicle (S120). In the target recognition process, the drive assist ECU 40 clusters the distance and angle measurement data and calculates, for each cluster, a central position coordinate of a target, the size of the target, the relative velocity of the target to the own vehicle, and the like. Further, in the target recognition process, the drive assist ECU 40 detects a respective type (for example, whether the target is a roadside object (ex. a guardrail) or leading vehicle) of each recognized target.

The drive assist ECU 40 obtains predetermined first information and estimates a first radius R1 which is a curvature radius of a first forward traveling path. In this embodiment, the drive assist ECU 40 estimates the first radius R1, on the basis of the state estimation information detected by the periphery detector section 3 or the behavior of the own vehicle detected by the vehicle state detector section 10 (S130). Here, the first forward traveling path is a part of the forward traveling path to which the own vehicle is going to travel, and extends a specified distance in front of the own vehicle.

Specifically, in the S130 of this embodiment, by a well-known method, the drive assist ECU 40 estimates the alignment of the first forward traveling path on the basis of the position of the roadside object (for example, a guardrail) recognized in the S120, and estimates the first radius R1. Here, the first radius R1 includes the curvature radius and the turning direction. In this embodiment, right turn is expressed by a positive value and left turn is expressed by a negative value.

It will be noted that the method for estimating the first radius R1 is not limited to the above method. There may be used a method based on the image captured by the imaging device 7 or a method based on the detection results of the vehicle state detector section 10.

For example, in the former method, the drive assist ECU 40 may recognize a lane marker (for example, a white line) by a well-known method based on the image captured by the imaging device 7, estimate the alignment of the first forward traveling path on the basis of the recognized lane marker, thereby estimating the first radius R1. For example, in the latter method, the drive assist ECU 40 may calculate the first radius, on the basis of the yaw rate $\gamma$ detected by the yaw rate sensor 12 and the velocity V (referred to own velocity) of the own vehicle calculated based on the detection result of the wheel velocity sensor 14, by dividing the own velocity V by the yaw rate $\gamma$.

Further, the method for estimating the first radius R1 is not limited to the above method, for example, there may be used a combination of these methods. In this case, the average or weighted average of the turning radiuses estimated by various methods may be defined as the first radius R1.

Subsequently, the drive assist ECU 40 obtains predetermined second information and estimates a second radius R2 which is a curvature radius of a second forward traveling path. In this embodiment, the drive assist ECU 40 estimates the second radius R2 on the basis of the state estimation information detected by the periphery detector section 3 (S140). Here, the second forward traveling path is a part of the forward traveling path to which the own vehicle is going to travel, and is farther ahead of the own vehicle than the first forward traveling path is. The second forward traveling path only has to have a forward end which is farther ahead of the own vehicle than the forward end (the specified distance) of the first forward traveling path being. The second forward traveling path may include a part of the first traveling path, may connect to the first forward traveling path continuously without overlapping, or may be separated from the first forward traveling path with an interval. In this embodiment, the rear end of the second forward traveling pathway is at or farther than the forward end of the first forward traveling pathway.

Specifically, in the S140 of this embodiment, by a well-known method, the drive assist ECU 40 estimates the alignment of the second forward traveling path on the basis of the position of the roadside object (for example, a guardrail) recognized in the S120, thereby estimating the second radius R2. Here, the second radius R2 includes the curvature radius and the turning direction. In this embodiment, right turn is expressed by a positive value and left turn is expressed by a negative value.

The method for estimating the second radius R2 is not limited to the above method. Alternatively, the drive assist ECU 40 may recognize a lane dividing line (for example, a white line) on the basis of the image captured by the imaging device 7, estimate the alignment of the second forward traveling path according to the recognized dividing line, and estimate the second radius R2. Further, the method for estimating the second radius R2 is not limited to the above method, there may be used a combination of the above methods. In this case, the average or weighted average of the turning radiuses estimated by various methods may be defined as the second radius R2.

Next, the drive assist ECU 40 calculates the absolute value $\Delta R$ of the difference between the first radius R1 and the second radius R2, and determines whether or not the calculation result is equal to or more than a specified threshold value Th (S150). Here, the threshold value Th is a lower limit of an absolute value of the difference between the first radius R1 and the second radius R2 which enables the detection of switching of the curvature radius in the forward traveling path.

In this embodiment, the absolute value $\Delta R$ may be calculated on the basis of the first radius R1 and the second radius R2 calculated from the same type of information, alternatively may be calculated on the basis of the first radius R1 and the second radius R2 calculated from the different types of information.

As the result of determination in the S150, if the absolute value $\Delta R$ of the difference between the first radius R1 and the second radius R2 is less than the threshold value Th (S150: NO), the drive assist ECU 40 determines there is no changing point where the road shape changes from the first forward traveling path to the second forward traveling path, and proceeds to S160. In the S160, the drive assist ECU 40 sets a road shape (for example, a straight road) having no changing point as the road shape of the forward traveling path from the first forward traveling path to the second forward traveling path, and proceeds to the S200 described in detail later.

On the other hand, as the result of the determination in the S150, if the absolute value $\Delta R$ of the difference between the first radius R1 and the second radius R2 is larger than or equal to the threshold value Th (S150: YES), the drive assist ECU 40 proceeds to S170.

In the S170, the drive assist ECU 40 estimates the turning direction in the first forward traveling path on the basis of the first radius R1, and estimates the turning direction in the second forward traveling path on the basis of the second radius R2. The drive assist ECU 40 determines whether or not these turning directions are inverted. Specifically, in the S170 of this embodiment, the drive assist ECU 40 determines the turning directions are inverted when the sign of the second radius R2 is opposite to the sign of the first radius R1.

As the result of the determination in the S170, if the turning direction in the first forward traveling path and the turning direction of the second forward traveling path are not inverted (S170: NO), the drive assist ECU 40 sets a type I as the road shape of the forward traveling path from the first forward traveling path to the second forward traveling path (S180).

Here, the type I is a type of a road shape having a changing point, and the type has, for example, a road shape changing from a straight road to a curved road. It should be noted that the type I of the road shape is not limited to the road shape changing from a straight road to a curved road. For example, the type I includes a road shape changing from a gently-curved road to a sharp-curved road, a road shape changing from a curved road to a straight road, a road shape changing from a sharp-curved road to a gently-curved road, and the like.

After that, the flow proceeds to S200.

On the other hand, as the result of the determination in S170, if the turning direction in the second forward traveling path is inverted from the turning direction of the first forward traveling path, the drive assist ECU 40 sets a type II as the road shape of the forward traveling path from the first forward traveling path to the second forward traveling path (S190). Here, the type II is a type of a road shape having a changing point in a forward traveling path, and, for example, includes an S-shaped curve where the first forward traveling path is a left-curved road and the second forward traveling path is a right-curved road.

Thereafter, the flow proceeds to S199 and S200.

In the S200, the drive assist ECU 40 selects a leading vehicle (referred to a target vehicle, below) satisfying a given target condition as a leading vehicle of a target vehicle. The target condition is, for example, that a new target vehicle is selected when the leading vehicle has satisfied a specified requirement continuously for a specified time period.

Since the specified requirement is well-known, detailed description is omitted here. An example of the specified requirement is that the vehicle is closest to the own vehicle among the leading vehicles existing in the forward traveling path.

In this embodiment, before S200, at first, in S199, the drive assist ECU 40 sets the target condition depending on the determination results of the changing point and road shape (S150 to S190). For example, if there is a changing point, the above specified time period is lengthened. In this case, if there is a changing point, a new target vehicle is less likely to be selected, and the present target vehicle is more likely to be maintained. Alternatively, if there is a changing point, the selecting interval of the target vehicle may be elongated. That is, if there is a changing point, the target condition is changed so that the probability of excluding the selected target vehicle is decreased.

Thereafter, the drive assist ECU 40 executes S200.

Subsequently, the drive assist ECU 40 outputs the engine ECU 22 or the brake ECU 24 the control command for keeping an inter-vehicular distance to the target vehicle selected in the S200 at a predetermined distance (S210). The engine ECU 22 or the brake ECU 24 controls the throttle actuator or the brake actuator on the basis of the control command received from the drive assist ECU 40.

Further, in S210, the drive assist ECU 40 outputs the meter ECU 26 display information relating to the ACC or the command for alarming when a predetermined condition is satisfied. In response to reception of the command, the meter ECU 26 displays the display information or alarms such as on a display panel.

After that, the drive assist ECU 40 terminates the drive assist process, and waits until the next iteration.

That is, in the drive assist process, the drive assist ECU 40 estimates the first radius R1 on the basis of the state estimation information obtained by the periphery detector section 3 or the behavior of the vehicle detected by the vehicle state detector section 10. Thereafter, in the drive assist process, the drive assist ECU 40 estimates the second radius R2 on the basis of the state estimation information obtained by the periphery detector section 3.

Further, the drive assist ECU 40 compares the first radius R1 with the second radius R2. If the difference between the first radius R1 and the second radius R2 is equal to or more than the threshold value Th, the drive assist ECU 40 determines there is a changing point where the road shape changes from the first forward traveling path to the second forward traveling path.

Figure 3:
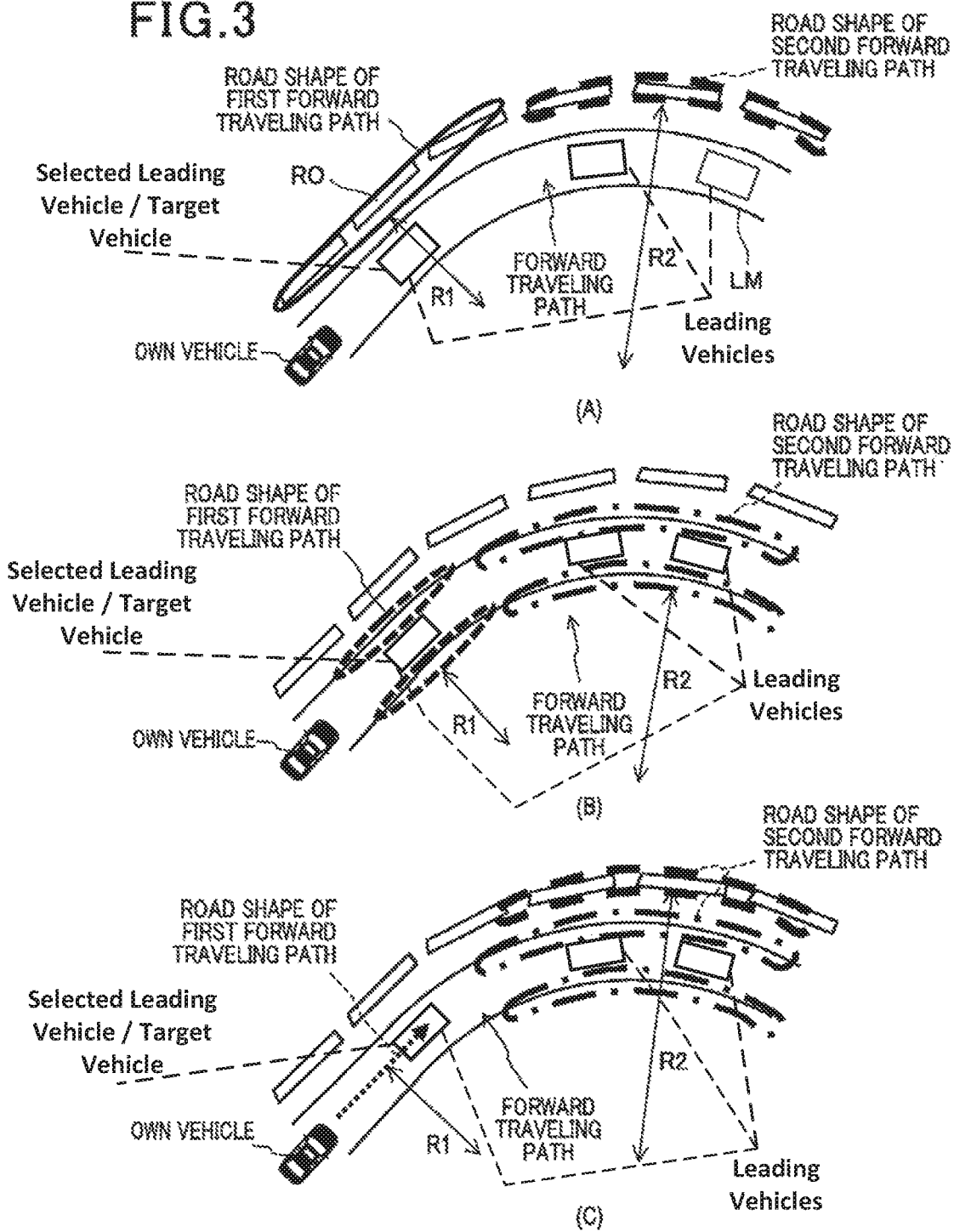
FIG. 3 is an explanatory view showing a specific example of a determination of changing point in the drive assist process, (A) showing a case using detection results of a radar sensor, (B) showing a case using captured images, (C) showing a case using signals of a vehicle state detector section and detection results of a radar sensor or captured images)

FIG. 3 is an explanatory view showing a state where the own vehicle is going to travel on a type I forward traveling path. (A) of FIG. 3 shows an explanatory view when both the first radius R1 and the second radius R2 are estimated on the basis of the detection results of the radar sensor 5. (B) of FIG. 3 shows an explanatory view when both the first radius R1 and the second radius R2 are estimated on the basis of the image captured by the imaging device 7. (C) of FIG. 3 shows an explanatory view when the first radius R1 is estimated on the basis of the signals detected by the vehicle state detector section 10 and the second radius R2 is estimated on the basis of the detection result of the radar sensor 5 or the image captured by the imaging device 7.

Figure 4:
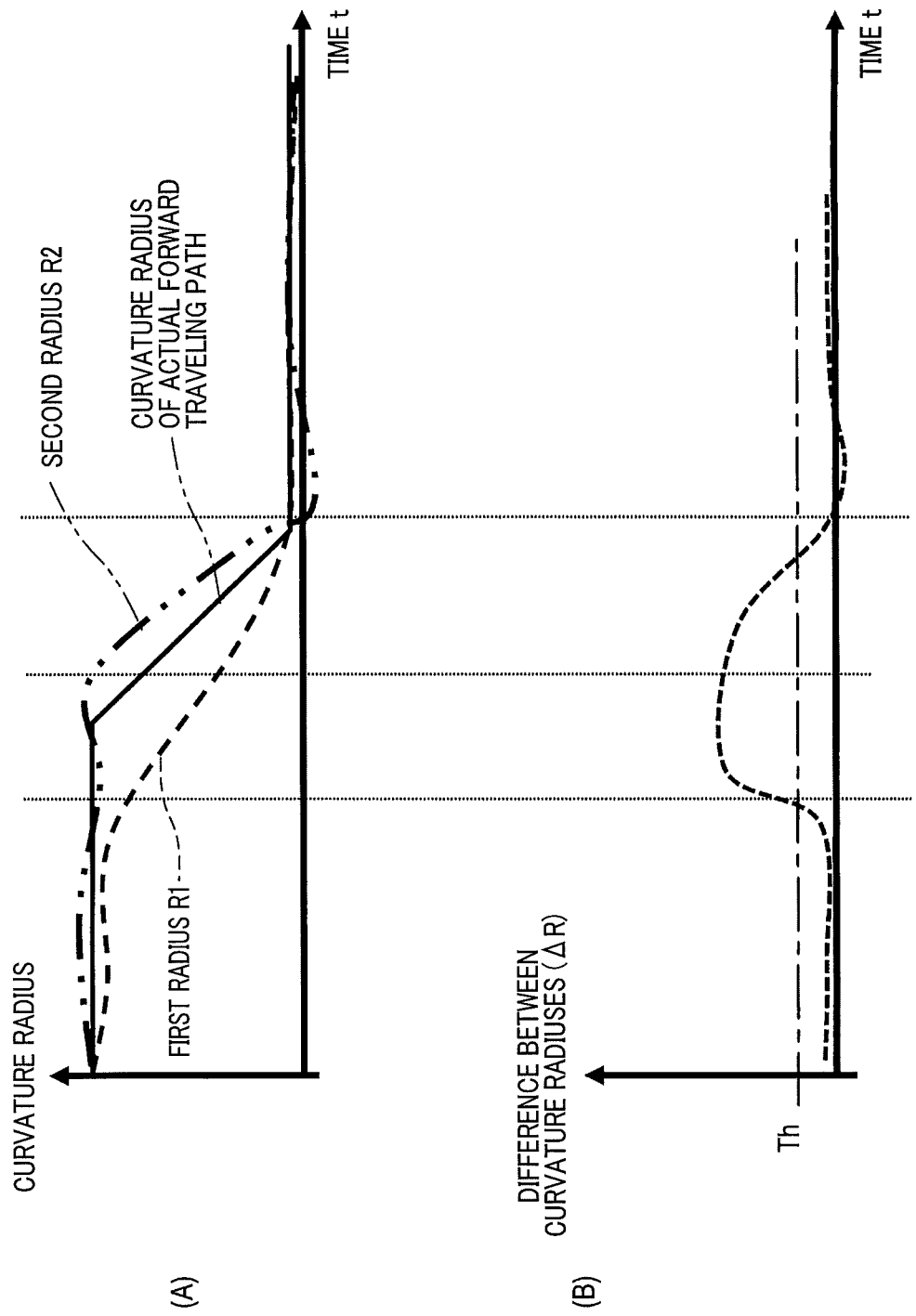
FIG. 4 is a view showing effects of determination of a changing point, (A) showing time change of the first and second curvature radiuses, (B) showing time change of a difference between the curvature radiuses.
Figure 5:
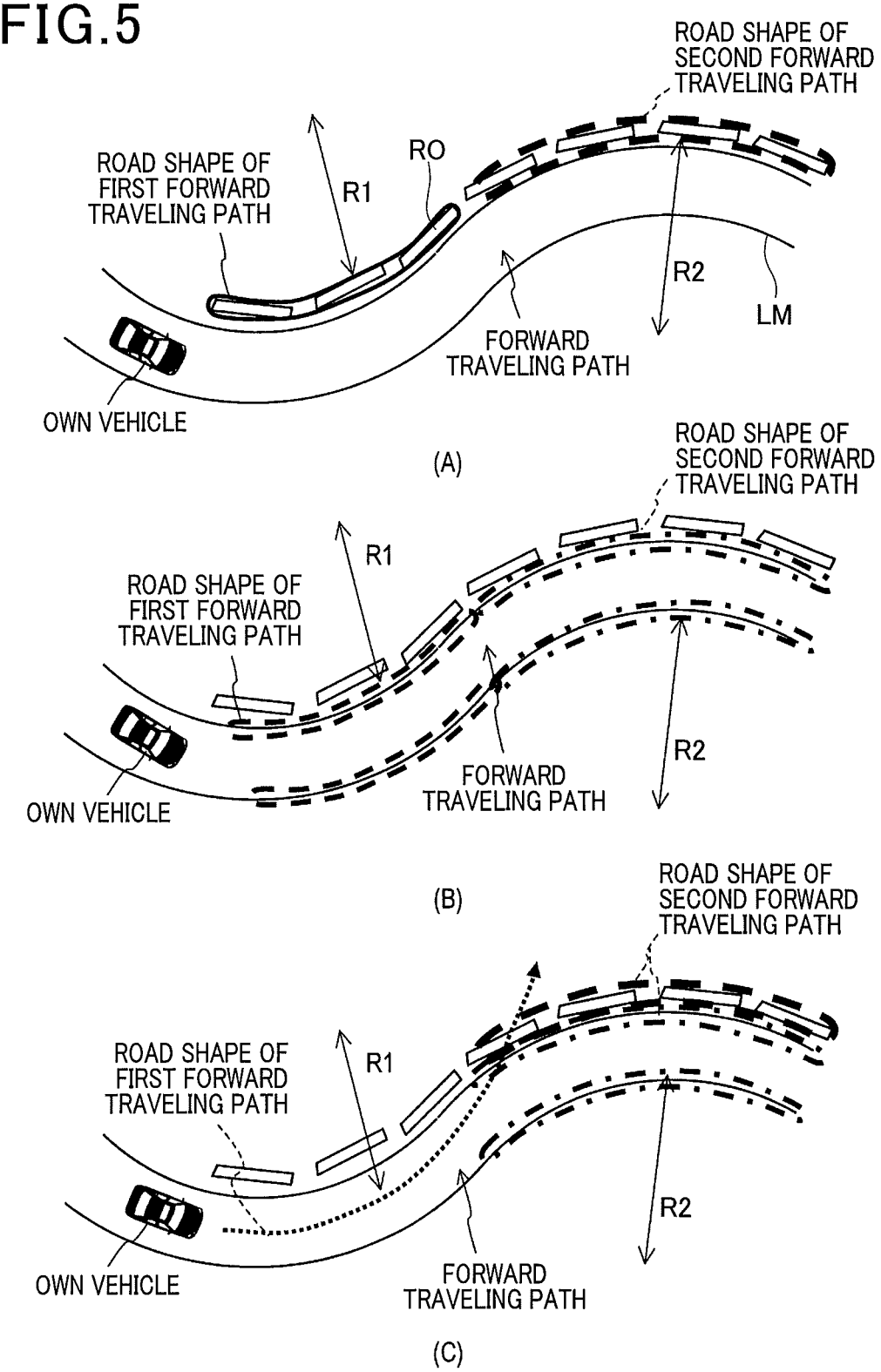
FIG. 5 is an explanatory view showing another specific example of a determination of changing point in the drive assist process, (A) showing a case using detection results of a radar sensor, (B) showing a case using captured images, (C) showing a case using signals of a vehicle state detector section and detection results of a radar sensor or captured images).

When the own vehicle travels on the type I forward traveling path shown in FIG. 3, the first radius R1 and the second radius R2 estimated in the drive assist process are shown in (A) of FIG. 4, the first radius R1 is small, and the second radius R2 is larger than the first radius R1, regardless of the calculation method of the first radius R1 and the second radius R2. The absolution value ΔR of the difference between the first radius R1 and the second radius R2 is larger than or equal to the threshold value Th, as shown in (B) of FIG. 4. In the type I forward traveling path, since the turning direction in the first forward traveling path and the turning direction in the second forward traveling is the same, the signs of the first radius R1 and the second radius R2 are not inverted from each other. In FIGS. 3 and 5, RO shows a roadside object (ex. guard rail), and LM shows a lane marker (ex. white line).

Thus, according to the drive assist process of this embodiment, the drive assist ECU 40 can estimate the road shape of the forward traveling path as the type I.

FIG. 5 is an explanatory view showing a state where the own vehicle is going to travel on a type II forward traveling path. (A) of FIG. 5 is an explanatory view when both the first radius R1 and the second radius R2 are estimated on the basis of the detection results of the radar sensor 5. (B) of FIG. 5 is an explanatory view when both the first radius R1 and the second radius R2 are estimated on the basis of the image captured by the imaging device 7. (C) of FIG. 5 is an explanatory view when the first radius R1 is estimated on the basis of the signals detected by the vehicle state detector section 10 and the second radius R2 is estimated on the basis of the detection result of the radar sensor 5 or the image captured by the imaging device 7.

When the own vehicle travels on the type II forward traveling path shown in FIG. 5, in the drive assist process regardless of the calculation method of the first radius R1 and the second radius R2, the first radius R1 is a negative value and the second radius R2 is a positive value. The absolute value ΔR of the difference between the first radius R1 and the second radius R2 is larger than or equal to the threshold value Th. Further, since the turning direction in the first forward traveling path and the turning direction in the second forward traveling are different, the signs of the first radius R1 and the second radius R2 are inverted from each other.

Thus, according to the drive assist process, the drive assist ECU 40 can estimate the road shape of the forward traveling path as the type II.

That is, the drive assist ECU 40 serves as a course estimator in the claims by executing the drive assist process.

Effects of this Embodiment

As described above, according to the drive assist ECU 40, it can determined whether or not there is a changing point in a road from the forward traveling path to the second forward traveling path.

Accordingly, the drive assist ECU 40 can reduce occurrence of deviation between the estimated road shape of the forward traveling path and the actual road shape of the forward traveling path, compared with the prior art.

That is, the drive assist ECU 40 can improve accuracy of estimating a road shape of the forward traveling path.

Especially, in the drive assist process of this embodiment, the existence or non-existence of the changing point in the forward traveling path from the first forward traveling path to the second forward traveling path is determined depending on whether or not the absolution value ΔR of the difference between the first radius R1 and the second radius R2 is equal to or more than the threshold value Th.

As a result, by the drive assist process, switching of the road shapes can be detected so as to match a change of road shapes in an actual forward traveling path, compared with conventional techniques.

In the drive assist process, if the turning direction in the first forward traveling path is opposite to the turning direction in the second forward traveling path, the drive assist ECU estimates the road shape from the first forward traveling path to the second forward traveling path as an S-shaped curve.

As a result, by the drive assist process, it can be estimated whether the road shape of the forward traveling path is S-curved.

On the other hand, in the drive assist process of this embodiment, if the turning direction of the first forward traveling path is not opposite to the turning direction of the second forward traveling path, the road shape of the forward traveling path from the first forward traveling path to the second forward traveling path is estimated to be a road shape (type I) changing from a straight road to a curved road.

As a result, by the drive assist process, the road shape of the forward traveling path can be estimated to be a road shape changing from a straight road to a curved road.

Further, in the drive assist process, the target condition for selecting the target vehicle is set depending on the determination results of the changing point.

That is, even if there is a changing point in the forward traveling path, in the prior art, the existence of the changing point cannot be recognized. This leads to the risk of incorrectly recognizing the leading vehicle existing on the forward traveling path of the own vehicle as a vehicle which does not exist on the forward traveling path of the own vehicle, thereby the target vehicle is not selected correctly.

On the other hand, the drive assist ECU 40 can recognize existence of a changing point of road shapes. Therefore, determination of a target vehicle using this result can decrease the possibility of excluding the proper target vehicle from the target vehicle.

Modifications

Though the invention has been described with respect to the specific preferred embodiments, many variations and modifications will become apparent to those skilled in the art upon reading the present application. It is therefore the intention that the claims be interpreted as broadly as possible in view of the prior art to include all such variations and modifications.

For example, the use of the determination results of the changing point is not limited to the process of selecting the target vehicle. For example, if a changing point is detected, a time constant of a filter for processing data may be lowered. Specifically, for example, a time constant of a noise filter (ex. an LPF) for removing noise (ex. high frequency component) from the time-series data detected by the vehicle state detector section 10 or the periphery detector section 3 may be changed depending on the determination results of the changing point, and the data which has passed through the filter may be used for the drive assist process.

More specifically, for example, the drive assist ECU 40 may have a predicting means (using another estimating method different from S150 to S190) for estimating the road shape of the forward traveling in S200, and recognize the leading vehicles on the forward traveling path estimated by the predicting means. The predicting means makes the time-series measurement data of the behavior of the own vehicle pass through a filter for estimating the road shape of the forward traveling path under the assumption that the behavior of the own vehicle is still kept, thereby estimating the road shape of the forward traveling path.

In this case, if there is a changing point, the time constant of the filter is lowered. This can cause the estimation results of the road shape of the forward traveling path by the predicting means to follow the behavior of the own vehicle, thereby improving responsibility.

For example, in the above embodiment, the first radius R1 and the second radius R2 are defined as curvature radiuses, but may be other indexes which indicate a radius R of a circular arc of a road. That is, the first radius R1 and the second radius R2 may be, for example, curvatures (1/R), which are indexes based on curvature radiuses, instead of curvature radiuses.

The periphery detector section 3 of this embodiment has both the radar sensor 5 and the imaging device 7, but need not to have both in the present invention. The periphery detector section 3 may have only any one of the radar sensor 5 and the imaging device 7.

The vehicle state detector section 10 has the yaw rate sensor 12, the wheel velocity sensor 14 and the steering angle sensor 16, but a vehicle state detector section 10 of the present invention is not limited to this. For example, in the vehicle state detector section 10, the angle sensor 16 may be omitted, or the yaw rate sensor 12 may be omitted. That is, a vehicle state detector section 10 may be any detector section which only has to have a sensor detecting the turning angle of the own vehicle and a sensor detecting the vehicle velocity of the own vehicle.

Further, in the present invention, the vehicle state detector section 10 may be omitted.

There may be applied an embodiment where a part of elements of the above embodiment is omitted as long as solves the problems. Also, there may be an arbitrary combination of the above embodiment and any one of the modifications.

The invention claimed is:

1. A course estimator, comprising:
an engine electronic control unit (ECU) located in a vehicle and having a first processor and a first memory;
a brake ECU located in the vehicle and having a second processor and a second memory;
a radar sensor located in the vehicle;
an imaging device located in the vehicle; and
a drive assist ECU located in the vehicle and having a third processor and a third memory, the third memory storing computer-executable instructions that cause the third processor to perform:
  obtaining first information from the radar sensor and the imaging device and estimating a first radius and a first turning direction of a first forward traveling path on the basis of the obtained first information, the first forward traveling path being a part of a forward traveling path of a road on which the vehicle is going to travel;
  obtaining second information from the radar sensor and the imaging device and estimating a second radius and a second turning direction of a second forward traveling path on the basis of the obtained second information, the second forward traveling path being a part of the forward traveling path of the road on which the vehicle is going to travel, the second forward traveling path being ahead of the first forward traveling path and farther from the vehicle than the first forward traveling path;
  determining whether an absolute value of a difference between the first radius and the second radius is greater than a predetermined threshold;
  determining whether the first turning direction of the first forward traveling path is inverted from the second turning direction of the second forward traveling path in response to determining that the absolute value of the difference is greater than the predetermined threshold;
  determining that a changing point exists in the road between the first forward traveling path and the second forward traveling path in response to determining that the absolute value of the difference is greater than the predetermined threshold and that the first turning direction of the first forward traveling path is inverted from the second turning direction of the second forward traveling path;
  determining that the changing point does not exist in the road between the first forward traveling path and the second forward traveling path in response to at least one of determining that the absolute value of the difference is not greater than the predetermined threshold and determining that the first turning direction of the first forward traveling path is not inverted from the second turning direction of the second forward traveling path;
  setting a specified time period to be a first time period in response to determining that the changing point does not exist in the road between the first forward traveling path and the second forward traveling path;
  setting the specified time period to be a second time period in response to determining that the changing point exists in the road between the first forward traveling path and the second forward traveling path, the second time period being longer than the first time period;
  recognizing positions of leading vehicles which are disposed ahead of the vehicle using the radar sensor and the imaging device; and
  selecting, from the leading vehicles, a following target vehicle that satisfies a predetermined condition continuously for a duration of the specified time period, the predetermined condition being that the following target vehicle is located at a shortest distance from the vehicle among the leading vehicles for the duration of the specified time period;
wherein:
the engine ECU controls a throttle of the vehicle to increase or decrease a driving force on the vehicle;
the brake ECU controls a brake actuator to increase or decrease braking force on the vehicle; and
the engine ECU controls the throttle and the brake electronic control unit controls the brake actuator to maintain a predetermined distance between the vehicle and the following target vehicle selected by the third processor.

2. The course estimator according to claim 1, wherein the first information and the second information are different in type from each other.

3. The course estimator according to claim 1, wherein the first information and the second information are the same in type.

4. The course estimator according to claim 1, wherein the drive assist ECU is further configured to lower a time constant of a noise filter for removing noise from time-series data corresponding to the first information or the second information, when determining that the changing point exists in the road between the first forward traveling path and the second forward traveling path.

5. The course estimator according to claim 4, wherein the noise filter removes a high-frequency component from the time-series data corresponding to the first information or the second information.

6. A non-transitory computer-readable storage medium containing thereon a program comprising instructions, the instructions comprising:
  obtaining, with a drive assist electronic control unit of a vehicle, first information from a radar sensor and an imaging device located in the vehicle, the drive assist electronic control unit having a first processor and a first memory;
  estimating, with the drive assist electronic control unit, a first radius and a first turning direction of a first forward traveling path on the basis of the first information, the first forward traveling path being a part of a forward traveling path of a road on which the vehicle is going to travel;

obtaining, with the drive assist electronic control unit, second information from the radar sensor and the imaging device;

estimating, with the drive assist electronic control unit, a second radius and a second turning direction of a second forward traveling path on the basis of the second information, the second forward traveling path being a part of the forward traveling path of the road on which the vehicle is going to travel, the second forward traveling path being ahead of the first forward traveling path and farther from the vehicle than the first forward traveling path;

determining, with the drive assist electronic control unit, whether an absolute value of a difference between the first radius and the second radius is greater than a predetermined threshold;

determining, with the drive assist electronic control unit, whether the first turning direction of the first forward traveling path is inverted from the second turning direction of the second forward traveling path in response to determining that the absolute value of the difference is greater than the predetermined threshold;

determining, with the drive assist electronic control unit, that a changing point exists in the road between the first forward traveling path and the second forward traveling path in response to determining that the absolute value of the difference is greater than the predetermined threshold and that the first turning direction of the first forward traveling path is inverted from the second turning direction of the second forward traveling path;

determine, with the drive assist electronic control unit, that the changing point does not exist in the road between the first forward traveling path and the second forward traveling path in response to at least one of determining that the absolute value of the difference is not greater than the predetermined threshold and determining that the first turning direction of the first forward traveling path is not inverted from the second turning direction of the second forward traveling path;

setting, with the drive assist electronic control unit, a specified time period to be a first time period in response to determining that that the changing point does not exist in the road between the first forward traveling path and the second forward traveling path;

setting, with the drive assist electronic control unit, the specified time period to be a second time period in response to determining that that the changing point exists in the road between the first forward traveling path and the second forward traveling path, the second time period being longer than the first time period;

recognizing, with the drive assist electronic control unit, positions of leading vehicles which are disposed ahead of the vehicle using the radar sensor and the imaging device;

selecting, with the drive assist electronic control unit, from the leading vehicles, a following target vehicle that satisfies a predetermined condition continuously for a duration of the specified time period, the predetermined condition being that the following target vehicle is located at a shortest distance from the vehicle among the leading vehicles for the duration of the specified time period; and controlling, with an engine electronic control unit located in the vehicle and having a second processor and a second memory, a throttle of the vehicle to increase or decrease a driving force on the vehicle, and controlling, with a brake electronic control unit located in the vehicle and having a third processor and a third memory, a brake actuator to increase or decrease braking force on the vehicle to keep a predetermined distance between the vehicle and the following target vehicle selected by the drive assist electronic control unit during operation of the vehicle.

* * * * *